United States Patent Office 3,464,254
Patented Sept. 2, 1969

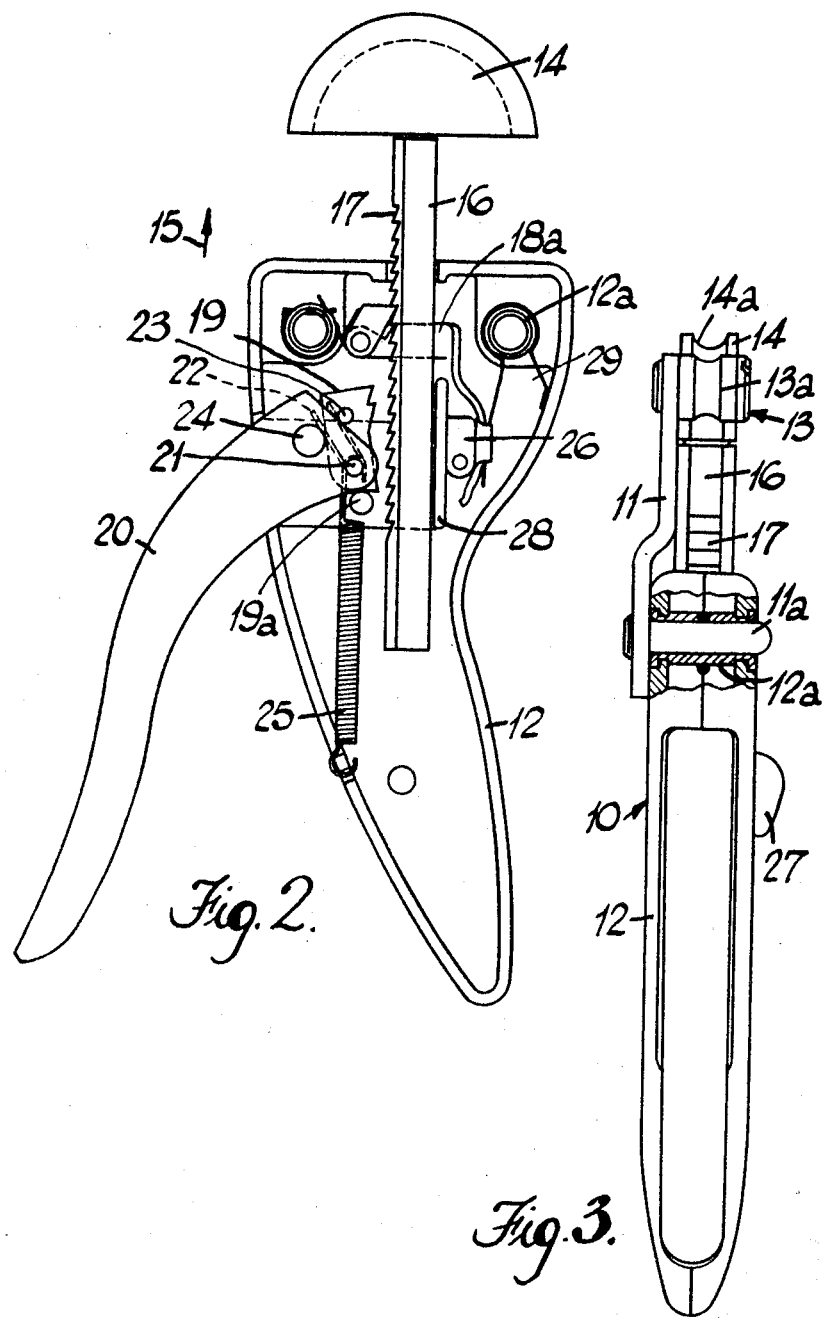

3,464,254
PIPE BENDING DEVICES
Leslie Arthur Le Breton, Overton, Mallings Lane,
Bearsted, Kent, England
Filed July 24, 1967, Ser. No. 655,580
Claims priority, application Great Britain, Aug. 12, 1966,
36,123/66
Int. Cl. B21d 9/05, 31/00
U.S. Cl. 72—389                                              1 Claim

ABSTRACT OF THE DISCLOSURE

A pipe bending device comprising a body having a pair of spaced abutments between which is linearly movable an anvil, the latter being movable in one direction by a a manually operable ratchet mechanism to bend a pipe between the anvil and the abutments and there being a releasable latch mechanism for enabling the anvil to move in the opposite direction.

---

Figure 1:
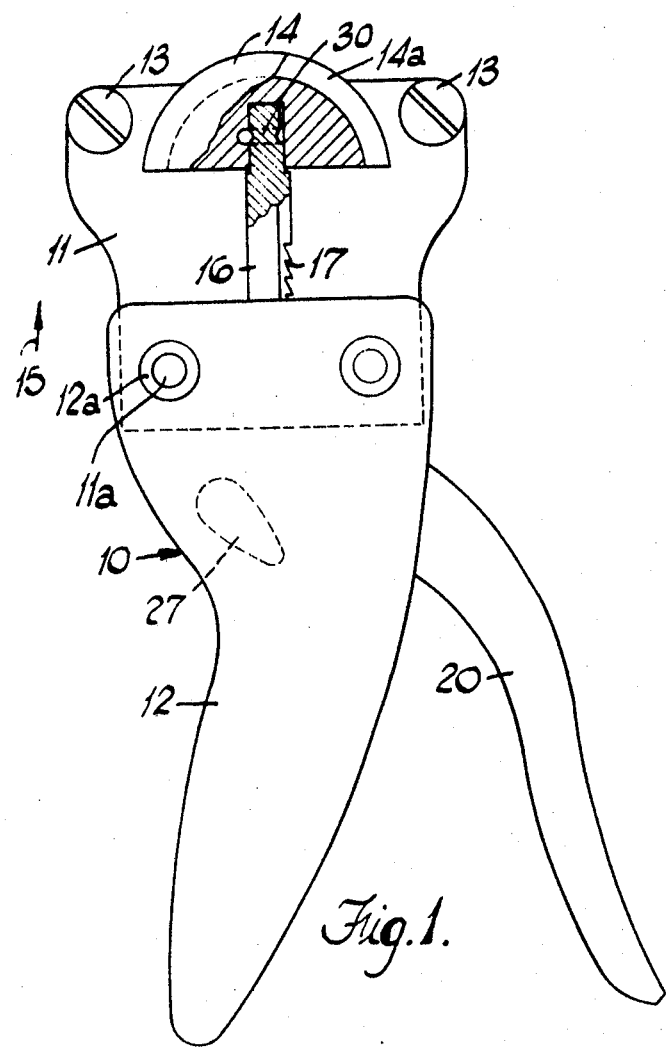

This invention relates to devices for bending pipes and has particular though not exclusive utility in relation to small bore pipes such as those which are commonly used in pneumatic or hydraulic equipment in many industries.

The object of the invention is to provide a pipe bending device in a particularly convenient form.

In accordance with the present invention a pipe bending device comprises a body, a pair of spaced abutments mounted in the body, an anvil mounted on the body for linear sliding movement relatively to the abutments, a ratchet mechanism on the body for moving the anvil in one direction, manually operable means for actuating the ratchet mechanism, and a spring-loaded latch mechanism operable to permit the anvil to be moved in the opposite direction, the arrangement being such that movement of the anvil in said one direction results, in use, in a pipe disposed between the anvil and the abutments being bent around the anvil.

The invention will now be described by way of example with reference to the accompanying drawings in which:

FIGURE 1 is a front elevation view of a device constructed in accordance with the invention, FIGURE 2 is a similar view with a part of the casing removed to show the interior mechanism, and FIGURE 3 is a side elevation view.

The device illustrated is intended to be hand operated and comprises a body 10 comprising, at one end a detachable substantially flat platform 11 and at the other end a mechanism enclosing casing 12. On the flat platform 11 are a pair of spaced abutments 13. The platform 11 is mounted by pins 11a engaging in respective bushes 12a in the casing 12. Mounted for linear sliding movement upon the body is an arcuate anvil 14 which is movable across the face of the platform 11 between the abutments 13 in a direction indicated by the arrow 15. As illustrated in FIGURE 3 the anvil 14 is provided in its arcuate edge with a groove 14a for reception of a pipe to be bent, the abutments 13 also being provided with rollers 13a of similar grooved configuration.

The anvil 14 is carried upon a rod 16 provided along one side with ratchet teeth 17. The teeth 17 are engageable by a spring-loaded latch pawl 18 pivotally mounted at one end of a member 18a in the casing. The teeth are also engageable by a further pawl 19 which is pivotally mounted on an arm 20 about a pin 21. Surrounding the pin 21 is a torsion spring 22 engaging at one end with a pin 23 on the pawl 19, and at the other end upon a pin 24 which also serves as the pivot for the arm 20. The pawl 19 at the lower limit of its permitted travel engages a pin 19a which causes the pawl 19 to become disengaged from the ratchet teeth 17. The arm 20 extends outwardly through a slot in the casing 12 and there is a tension spring 25 acting between the casing 12 and the pin 21 on the arm 20. The casing is so shaped that it provides one handle whilst the arm 20 serves as a second handle. The ratchet mechanism described is such that movement of the arm 20 towards the casing 12 against its spring 25 causes the pawl 19 to move the rod 16 and thus the anvil 14, in the direction of the arrow 15. With this arrangement, the rod 16 can be advanced progressively to bend a pipe disposed between the anvil 14 and the abutments 13, the latch pawl 18 serving to prevent return of the rod 16 upon release of the arm 20.

In order to release the rod 16, thus enabling a bent tube to be extracted from the device, the latch pawl 18 can be actuated by a mecheanism incorporating a cam 26 normally occupying the position illustrated, but rotatable by means of an externally accessible actuating member 27. The cam 26 is disposed between a reaction member 28 on the casing 12 and the end of the member 18a remote from the latch pawl 18. A spring 29 surrounding one of the bushes 12a urges the member 18a into its position shown. Actuation of the member 27 results in rotation of the cam 26 which causes the member 18a to be moved so that the pawl 18 lies against the ratchet teeth 17 with its engaging edge thus out of engagement with the teeth. The rod 16 can now be moved freely in the direction opposite to that indicated by the arrow 15.

It is to be understood that other forms of latch may be provided, but the form illustrated is particularly convenient in that it can be operated by the thumb when the device is being held and operated in the right hand.

The anvil 14 is detachably mounted upon the rod 16 by a bayonet type attachment shown in FIGURE 1 and identified by numeral 30. By this arrangement alternative anvil forms can be used. Furthermore the detachable platform 11 enables the device to be used either in the users right or his left hand by suitable reversal of the platform 11.

Having thus described my invention what I claim as new and desire to secure by Letters Patent is:

1. A pipe bending device comprising a body, a reversable detachable platform on the body which can be attached to either side thereof, a pair of spaced abutments mounted on the platform, an anvil mounted on the body for linear sliding movement relatively to the abutments, a ratchet mechanism on the body arranged to permit movement of the anvil in one direction, manually operable means for actuating the ratchet mechanism, a spring loaded latch mechanism on the body, and operating means on the body for the latch mechanism, operation of said latch mechanism against its spring loading permitting the anvil to be moved in the opposite direction, the arrangement being such that movement of the anvil in said one direction results in use, in a pipe disposed between the anvil and the abutments being bent around the anvil.

References Cited

UNITED STATES PATENTS

| 479,491   | 7/1892  | Cowell   | 72—389 |
| 1,079,442 | 11/1913 | Rutledge | 72—389 |
| 1,596,419 | 8/1926  | Fernald  | 72—381 |
| 2,382,266 | 8/1945  | Simonsen | 72—389 |
| 2,464,459 | 3/1949  | Newlon   | 72—389 |

FOREIGN PATENTS

| 1,353,336 | 1/1964 | France. |

CHARLES W. LANHAM, Primary Examiner
G. P. CROSBY, Assistant Examiner